US008919495B2

(12) United States Patent
Mäder

(10) Patent No.: US 8,919,495 B2
(45) Date of Patent: Dec. 30, 2014

(54) METHOD FOR PRODUCING A DOUBLE-LAYER OR TRIPLE-LAYER SOUND-ABSORBING PANEL AND CORRESPONDING SOUND-ABSORBING PANEL

(71) Applicant: Akustik & Innovation GmbH, Wangen bei Olten (CH)

(72) Inventor: Marco Mäder, Wangen bei Olten (CH)

(73) Assignee: Akustik & Innovation GmbH, Wangen Bei Olten (CH)

( * ) Notice: Subject to any disclaimer, the term of this patent is extended or adjusted under 35 U.S.C. 154(b) by 81 days.

(21) Appl. No.: 13/647,830

(22) Filed: Oct. 9, 2012

(65) Prior Publication Data

US 2013/0087408 A1 Apr. 11, 2013

(30) Foreign Application Priority Data

Oct. 7, 2011 (EP) ..................................... 11184397

(51) Int. Cl.
*E04B 1/82* (2006.01)
*E04B 1/84* (2006.01)
*B32B 3/12* (2006.01)
*B23K 26/36* (2014.01)
*G10K 11/168* (2006.01)
*E04B 1/86* (2006.01)
*G10K 11/172* (2006.01)

(52) U.S. Cl.
CPC ............. *E04B 1/84* (2013.01); *E04B 2001/849* (2013.01); *B23K 26/362* (2013.01); *G10K 11/168* (2013.01); *E04B 2001/8461* (2013.01); *E04B 1/86* (2013.01); *G10K 11/172* (2013.01)
USPC ........... 181/292; 181/286; 181/290; 181/293; 428/116

(58) Field of Classification Search
CPC ...... G10K 11/172; G10K 11/168; E04B 1/84; E04B 1/86; B23K 26/362
USPC .................... 181/292, 293, 290, 286; 428/116
See application file for complete search history.

(56) References Cited

U.S. PATENT DOCUMENTS 4,257,998 A * 3/1981 Diepenbrock et al. ......... 264/156
4,291,080 A * 9/1981 Ely et al. ........................ 428/116

(Continued)

FOREIGN PATENT DOCUMENTS

EP 0992636 A2 * 4/2000
EP 1820915 A1 * 8/2007

(Continued)

*Primary Examiner* — David Warren
*Assistant Examiner* — Christina Russell
(74) *Attorney, Agent, or Firm* — Browdy and Neimark, PLLC

(57) ABSTRACT

A method for producing a double-layer or triple-layer sound-absorbing panel (10) is specified, said panel consisting of a support panel (20) and at least one cover panel or coating (30, 35) of the support panel (20), the cover panel or coating (30, 35) being fixedly connected to the support panel (20). In this case, an open-pore (121) support panel is provided as the support panel (20) and the sound-absorbing panel (10) is arranged on each side (12, 13) provided with a cover panel or coating (30, 35) with a device opposing said side emitting a laser beam, the upper face (12) of said panel (10) being subjected to the laser beam, which is designed to burn away material from the cover panel or coating (30, 35) facing said laser beam over the depth in the direction of the laser beam in a plurality of holes (31). In this case, the laser beam acting on the panel (10) is designed such that the waist of the laser beam is focused on a plane parallel to the lower face of the cover panel or top layer (30, 35) such that the holes (31) are continuous through the cover panel or top layer (30, 35), and a lower hole opening/hole end (33) is produced in the support panel (20) itself so that the surroundings are connected to the open-pore support panel (20) via an air connection (121).

13 Claims, 2 Drawing Sheets

(56) References Cited

U.S. PATENT DOCUMENTS

| | | | |
|---|---|---|---|
| 4,816,097 A * | 3/1989 | Williams et al. | 156/247 |
| 4,849,276 A * | 7/1989 | Bendig et al. | 428/117 |
| 5,653,836 A * | 8/1997 | Mnich et al. | 156/98 |
| 6,789,646 B2 * | 9/2004 | Wang et al. | 181/293 |
| 6,871,725 B2 * | 3/2005 | Johnson | 181/292 |
| 8,381,872 B2 * | 2/2013 | Alexander et al. | 181/296 |
| 2003/0141144 A1 * | 7/2003 | Wilson | 181/292 |
| 2004/0069564 A1 * | 4/2004 | Wang et al. | 181/293 |
| 2005/0147790 A1 * | 7/2005 | Levavasseur | 428/116 |
| 2011/0198151 A1 * | 8/2011 | Oakley et al. | 181/290 |
| 2012/0155688 A1 * | 6/2012 | Wilson | 381/354 |
| 2013/0142584 A1 * | 6/2013 | Huchet | 409/131 |

FOREIGN PATENT DOCUMENTS

| | | | | |
|---|---|---|---|---|
| WO | WO 2006056351 A1 * | 6/2006 | | G10K 11/172 |
| WO | WO 2006114090 A3 * | 11/2006 | | |
| WO | WO 2007134626 A1 * | 11/2007 | | B60R 13/08 |

* cited by examiner

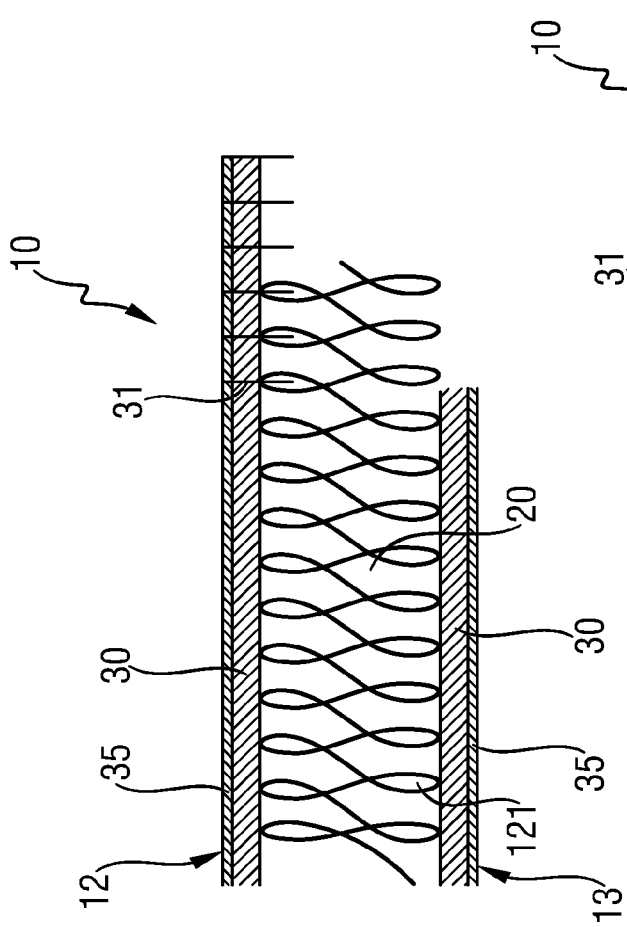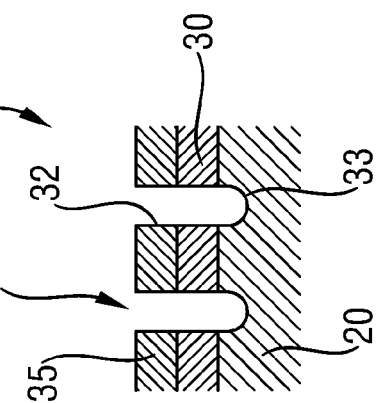

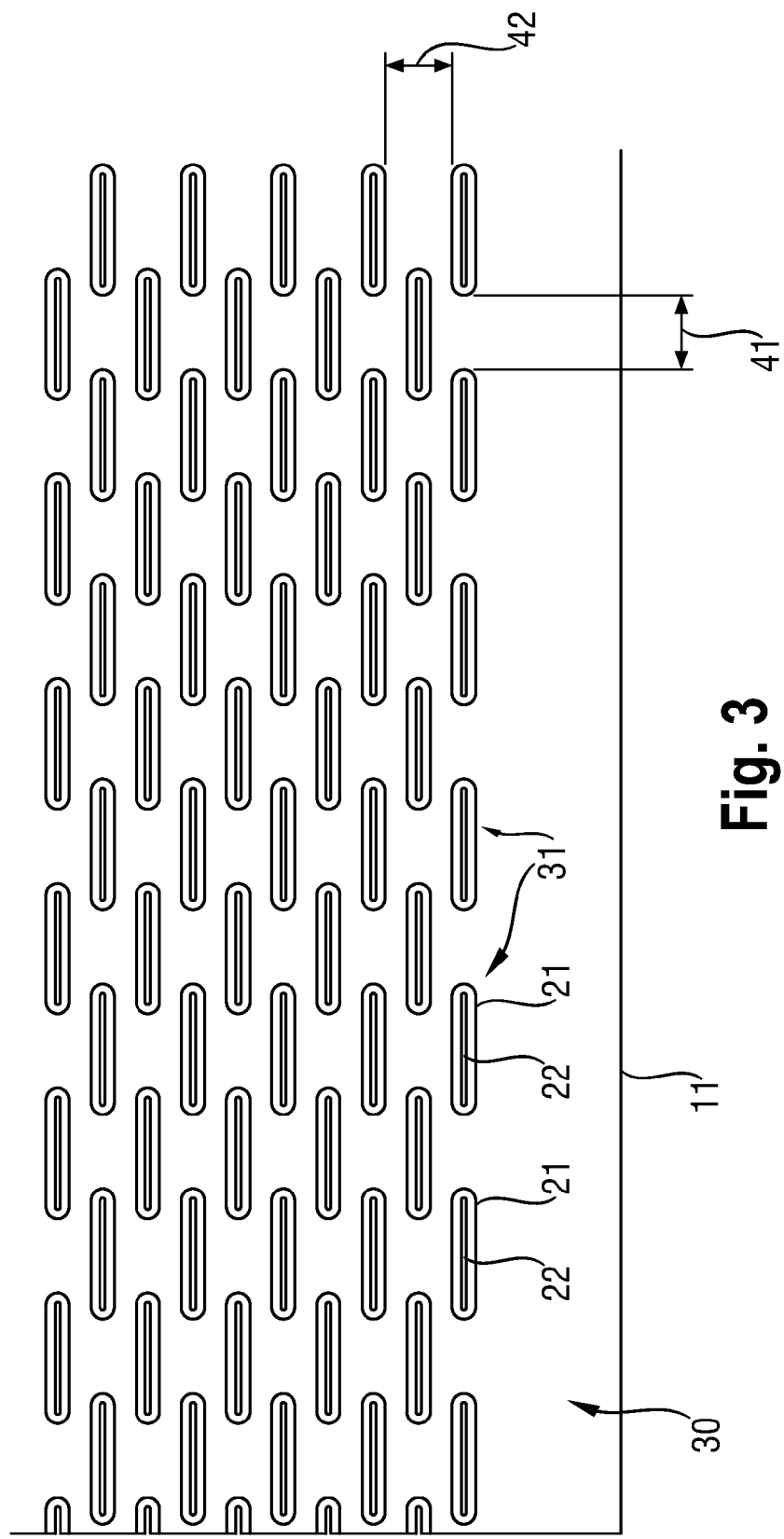

METHOD FOR PRODUCING A DOUBLE-LAYER OR TRIPLE-LAYER SOUND-ABSORBING PANEL AND CORRESPONDING SOUND-ABSORBING PANEL

TECHNICAL FIELD

The present invention relates to a method for producing a double-layer or triple-layer sound-absorbing panel, in particular a wooden panel having the features of the preamble of Claim 1. The invention further relates to such a double-layer or triple-layer sound-absorbing panel comprising a central panel, in particular made of wood, on which in each case a thin, smooth cover layer is placed on both sides, according to the features of the preamble of Claim 8.

PRIOR ART

A triple-layer sound-absorbing wooden panel having the features of the preamble of Claim 8 is disclosed in WO 2006/056351. The central support panel consists of a wood-based material into which holes are cut, in particular by drilling. On said support panel at least on one side, advantageously on both sides, cover panels or coatings are applied into which a plurality of holes have been drilled, the holes in the panel and the associated cover panel being at least partially aligned with one another. The holes have a diameter of 0.5 to 1.5 millimeters and may also be corresponding slots. The support panel may have a thickness of 5 to 50 millimeters, preferably 10 to 20 millimeters. This construction of a sound-absorbing panel is costly, as the central wooden panel is treated over its entire depth; as a result the potential maximum surface area of the sound-absorbing panel is reduced. Moreover, it is necessary to coordinate the connection and, in particular, the bonding of the cover panels or coatings of the support panel in order to achieve at least partially an overlap of the hole pattern. Therefore, advantageously in the prior art, grooves are incorporated in the support panel but said grooves negatively influence the smooth connection of the coating to the support panel.

A triple-layer sound-absorbing lightweight building panel with a honeycomb core is disclosed in WO 2006/114090. The honeycomb core is a structure consisting of close-mesh coarse paper honeycomb. The planking consists of thin wood-based material panels, and has through-holes on one or more sides. The planking may be formed by a veneer, which may have a thickness of 0.4 millimeters or more. Decorative films, paper or plastic panels may also be used, in each case the through-holes being formed by boring, milling or stamping. The holes produced thereby have a diameter of 1 to 20 millimeters. Said acoustic panel only absorbs sound by using a laminated acoustic fleece.

A sound-absorbing device and a method for the production thereof have been disclosed in US 2004/069564 A1. The device comprises an outer layer, a sound-absorbing layer and a plurality of respectively perforated layers which are connected to the sound-absorbing layer. The perforated layers provide a structural rigidity and by means of the perforated points define a plurality of resonators for sound absorption.

WO 2007/134626 A1 teaches a sound-absorbing panel element consisting of a core which is covered on both sides by a layer. Both the core and the top layers provided parallel to one another have sound-permeable recesses. The core additionally comprises channels extending substantially parallel to the top layers for cleaning purposes. Moreover, a sound-absorbing layer is applied at least partially to at least one of the top layers.

EP 1 820 915 A1 relates to a method for producing acoustic building panels and such building panels. A supporting structure is produced which is laminated with a top layer, said top layer being provided with micro-perforations by means of laser light after the lamination process.

EP 0 992 636 A2 discloses a sound-absorbing panel consisting of a sound-absorbing supporting layer with a top layer fixedly connected to the supporting layer. The top layer is provided with micro-perforations, in order to conduct the sound from outside into the absorbing supporting layer. To increase the absorption efficiency, recesses which are wider than the perforations are incorporated in the supporting layer.

DESCRIPTION OF THE INVENTION

Proceeding from this prior art, the object of the invention is to specify a method by which a sound-absorbing acoustic panel may be constructed so as to be less costly in terms of treatment. It is, therefore, an object of the invention to produce such a panel in an efficient and cost-effective manner.

This object is achieved according to the invention by a method having the features of Claim 1.

A method for producing a double-layer or triple-layer sound-absorbing panel is specified, therefore, said panel consisting of a support panel and at least one cover panel or coating of the support panel, the cover panel or coating being fixedly connected to the support panel. In this case, preferably an open-pore support panel is provided as the support panel and the sound-absorbing panel is arranged on each side, provided with a cover panel or coating, with a device opposite said side emitting a laser beam, the upper face of said panel being subjected to the laser beam, which is designed to burn away material from the cover panel or coating facing said laser beam over the depth in the direction of the laser beam in a plurality of holes. In this case, the laser beam is designed to act on the panel such that the waist of the laser beam is focused on a plane parallel to the lower face of the cover panel or top layer, such that the holes are continuous through the cover panel or top layer, and a lower hole opening, i.e. a lower hole end or hole base is produced in the support panel itself so that a blind hole terminating in the support panel is produced, the surroundings being connected to the open-pore support panel via an air connection.

"Blind hole" is thus understood as a hole which enters the support panel but does not fully penetrate said support panel. By the partial penetration of the blind hole into the support panel, the support panel surface on the blind hole side, which is assigned to a through-hole through the cover panel or top layer, is enlarged. This produces improved sound input from outside into the support panel and thus optimized sound absorption through the panel. In terms of manufacturing technology, it is also advantageous if the continuous hole through the cover panel or top layer and the blind hole in the support panel are able to be introduced in one step by laser perforation and form a single blind hole. Thus, in a single radiation step the through-hole is produced through the cover panel or top layer and the blind hole is produced in the support panel and thus the blind hole in the acoustic panel. Additionally, by the fixed fastening of the cover panel or top layer and support panel before the perforation treatment step, it is ensured that the through-hole and the associated blind hole are optimally always located on top of one another. Thus the sound is then optimally attenuated in the panel. Moreover, the stability of the support panel is weakened less by blind holes than by through-holes. Thus no special measures have to be taken in order to start the drilling process behind the support panel, as the drilling and/or perforation always terminates in the support panel. Additionally, increased error tolerance is present in the depth of the blind hole, as a result of which the introduction of the hole is simpler.

Particularly preferred is an acoustic panel with a top layer or cover panels on both sides, having blind holes on both sides. Thus due to the exposure of this acoustic panel to sound on one side, the sound is introduced into the blind holes on the sound-exposure side, attenuated and conveyed further into the depth of the acoustic panel through the blind hole into the support panel. The sound is then able to be propagated by continuous attenuation in the open pores of the support panel through the support panel into a blind hole located opposite the blind hole already passed and is then further attenuated in said opposing blind hole. By the preferred choice of an open-pore support panel in this manner an acoustic channel is present from one blind hole via the support panel into further blind holes, in particular the blind hole opposing the blind hole of the original sound input being relevant and potentially blind holes directly adjacent thereto due to the distance and the direction of sound propagation. Thus an acoustic channel is present from one side of the acoustic panel, via the blind holes there and the open pores of the support panel to the blind holes on the other side of the acoustic panel. As a result, blind holes located on the same side of the panel are also connected acoustically together via the open pores.

The opposing blind holes in this case do not have to be directly opposite, i.e. in the direction perpendicular to the surface of the acoustic panel. They may also be offset laterally.

Each chipboard panel has internal cavities as a result of its manufacture. Said cavities form, depending on the thickness, a panel through which air may be blown with resistance. This reveals the presence of continuous pores. Such so-called open-pore chipboard panels are preferred. Instead of a single panel, multi-layer panels may also be used.

At the same time, the sound-absorbing properties are intended to be improved relative to panels of the prior art. A further object of the invention is to provide a multi-layer panel which may be effectively used in the field of furniture construction, as its perforated surface is more attractive than the multi-layer panels according to the prior art.

This further object of the invention is achieved by the features of Claim 8.

As the panel according to the invention is a panel which has an open-pore central layer, onto which the covering panel layers may already be applied during manufacture of the panel, the production process may be very simplified in terms of the wooden construction. As a result, it is sufficient to subject this panel to a laser beam at least on one side, so that micro-slots are produced through the covering panel surface, advantageously said micro-slots not only being pushed through the upper cover panel but extending into the uppermost layers of the open-pore support panel. In addition to coverings made of wood, also plastic coverings, etc. and other coatings from the prior art may be used. The lasering has the advantage of being substantially invisible in terms of visual appearance, which additionally may be carried out rapidly. After laser treatment, the panel according to the invention has a free surface of 3 to 10 percent, preferably with a uniform slot spacing.

A panel comprising more pores and internal cavities may be obtained as an open-pore panel by a lighter filling of the chipboard particles being provided during production of the internal panel so that the density of the chipboard particles is reduced. Said chipboard particles are thus compressed to a lesser degree. An essential feature of such an open-pore panel is the efficient provision of a large number of connecting holes preferably on both sides through the laminated materials providing the visual appearance. This is available as a "laminated chipboard panel" with a thin covering material, whilst with thicker top layers it is denoted as "covered chipboard panel".

As previous treatment of the raw chipboard panel is not necessary, this is a great advantage and it permits greater sound-absorbing acoustic panels to be produced. It is surprising that it is sufficient in this case to treat the thin cover panels on both sides with a scanning laser, in order to produce the connection, in terms of sound absorption technology, of the surrounding space with the internal chipboard panel. It is important here that, via the micro-slots produced by the laser, the closed outer layers of the coating or cover panel are perforated and the open central layer of the chipboard panel is cut-into so that a panel which is absorbent in all layers may be produced.

Further embodiments are specified in the sub-claims dependent.

BRIEF DESCRIPTION OF THE DRAWINGS

Preferred embodiments of the invention are described hereinafter with reference to the drawings, which merely serve for the description and are not to be interpreted as limiting the invention. In the drawings:

FIG. 1 shows a schematic cross-sectional view of a triple-layer sound-absorbing acoustic panel according to an exemplary embodiment of the invention;

FIG. 2 shows a schematic plan view of a top layer of the acoustic panel with the support panel cut-into according to FIG. 1; and FIG. 3 shows a plan view of the top layer of the acoustic panel according to FIG. 1 with an arrangement of continuous slots in this top layer.

DESCRIPTION OF PREFERRED EMBODIMENTS

FIG. 1 shows a schematic cross-sectional view of a triple-layer sound-absorbing acoustic panel 10 according to an exemplary embodiment of the invention. The central layer or support panel 20 of the sound-absorbing wooden panel according to the exemplary embodiment of the invention consists of a so-called open-pore chipboard panel. Said support panel 20 as the central layer in the form of an open chipboard panel is per se suitable for absorbing sound. This is because it has sufficient air cavities 121 between the chipboard particles creating said air cavities. Such a chipboard panel may be obtained, for example, under the trade name Akkupor-H from BER Ceiling Systems, D-33161 Hövelhof, Germany. A further panel from BER Ceiling Systems is the 3-layer acoustic panel in which three wooden panels are glued together and the upper and the lower panel is perforated.

A further panel may be obtained under the trade name Homalight S from Homanit GmbH & Co KG, 66674 Losheim am See, Germany, in which the central chipboard-wood layer is covered with HDF panels, in particular with a top layer 3 millimeters thick.

Pure chipboard panels 20 are not able to be used in this manner for technical applications in the furniture industry, due to the visual appearance of the chipboard particles, and are covered by at least one, generally two layers 30 and 35. A thin, fine chipboard layer is denoted by the reference numeral 30, which has very fine chipboard particles, so that the surface of the final coating 35 is smooth. In other words, the thin lower layer 30 fills in the rougher unevenness of the open chipboard panel 20.

The reference numeral 35 refers to a top coating which may be a decorative paper, a synthetic resin layer or veneer.

The chipboard panel 20 may itself also be multi-layered. In this regard, the term chipboard panel 20 in the singular may also be used for multi-layer open-pore panels, as it only refers to the fact that pores exist in the panel which pass through the panel from one side to the other, possibly in a meandering fashion.

The panel 20 may also be a panel made of a solid porous plastics material or a wood-plastics material composite.

Advantageously, the open-pore support panel 20 is provided on both sides with said layers 30 and 35, so that the resulting panel 10, for example, may be used for doors in furniture construction. Holes, blind holes, slots or micro-slots are denoted by the reference numeral 31 which, after producing the coated open-pore chipboard panel 10, may be introduced from at least one side, preferably on both sides through the two top layers 30 and 35; said holes, blind holes, slots or micro-slots are also shown enlarged in FIG. 2 in cross section according to an exemplary embodiment.

To this end, according to a method according to an exemplary embodiment of the invention, the coatings covering the chipboard panel 20 are scanned with a continuous beam laser along the rows of the resulting holes, slots or micro-slots. A corresponding distribution of slots 31 is visible in FIG. 3, which shows a plan view of a detail of said panel 10, not completely to scale.

The covering panel 30 may consist of a polymer material, in particular PET. Generally, it may also be laminated with melamine resin paper, which is denoted by the person skilled in the art as a laminated chipboard panel. The coating may have a thickness of, for example, 0.2 to 2 millimeters, in particular 1 millimeter. It is also possible to produce the panel 30 from a metal such as aluminium or from wood. All materials are possible in which micro-slots, in particular, may be produced by laser light radiation.

The size of the panel 30 may be in the square meter range, for example, it may be 1 by 2 meters in size, in the sketch of FIG. 3 only two side edges 11 of a corner being illustrated as a reference to the size of the panel 30. A plurality of micro-slots 31 are introduced over the surface of the panel 30, said micro-slots being able to be distributed uniformly or non-uniformly.

In the first exemplary embodiment shown, the micro-slots 31 in each case have a length of 4 millimeters and are in each case arranged one behind the other in the direction of their longitudinal axis. The lateral spacing between two treatment lines in the exemplary embodiment shown on the upper face 12 is one millimeter. The spacing between two slots 31 in the longitudinal direction is 2 millimeters, generally between 1.5 and 3 millimeters.

In a panel 30 of 1 meter by 1 meter, therefore, ca. 166 micro-slots are produced per row and with ca. 999 rows approximately 165,000 micro-slots are produced in the panel.

Advantageously and as set forth below, an engraving laser is used which successively moves via a scanning device across the rows of holes to be individually produced and is able to complete a panel in approximately 16.5 minutes, at a scanning rate of, for example, 1 meter/second.

In the other exemplary embodiment, not shown in the drawings, the narrower micro-slots 31 of the panel 30 have different lengths of 3 and 6 millimeters and are also respectively arranged in succession in the direction of their longitudinal axis. The lateral spacing 42 between two treatment lines in the exemplary embodiment shown is 1 millimeter. The spacing 41 between two slots 31 in the longitudinal direction is 1 millimeter. Other linear arrangements with the individual micro-slots 31 arranged at different angles relative to one another are possible.

Naturally, other sizes and dimensions may also be used, thus in other exemplary embodiments the micro-slots 31 may have a length of 1 millimeter to 4 centimeters and a spacing 41 from one another in the longitudinal direction of 1 millimeter to 1 centimeter. The lateral spacing 42 of the rows from one another may be 0.5 to 10 millimeters.

The micro-slots 31 in the material of the panel 30 in each case have an oblique side wall 21 of the slot 31 and a lower hole 22. The oblique side walls 21 are aligned substantially symmetrically to a central axis or hole axis in cross section. They may be formed in the panel 30 or in the central panel 10.

In the exemplary embodiment shown in FIG. 2, the side walls are not formed obliquely but semi-circular in cross section, said rounded grooves being produced after having been subjected to the laser. According to FIG. 2, they are advantageously located within the depth of the central panel 20. The quadrant of the opening within the depth, as in the above-mentioned but not shown oblique opening lines, symmetrically follows the hole axis in the exemplary embodiment shown. Thus an opening angle is produced between the two straight lines, which in cross section generates a funnel or truncated cone or cylinder casing based on an oval. Said opening angle is defined on the upper face 12 of the panel 30 by the larger upper opening and on the lower face 13 of the panel by the smaller continuous elongate hole 22. The opening size, i.e. the angle between the straight lines is generally relevant for the respective proportions. The angle may adopt a value of between approximately 5 degrees and 60 degrees, preferably between 10 and 50 degrees, preferably 45 degrees. The angle shown in the exemplary embodiment of FIG. 2 is 45 degrees.

The width of the slot 31 should be 0.05 to 0.5 millimeters, advantageously in particular ca. 0.2 to 0.4 millimeters, advantageously 0.3 millimeters. This width of the micro-slot permits the internal cavities 121 of the panel 10 to be exposed to sound unhindered. A separate sound-absorbing action of the top panels 30 and 35 is advantageously achieved with narrower micro-slots of ca. 0.1 to 0.15 millimeters width.

The cited opening angle of 5 to 60 degrees in each case refers to the angle between the vertical and one of the associated opening lines so that with an advantageous angle of 45 degrees a width of the upper hole is produced relative to the double thickness of the panel 30 plus the width of the lower hole.

Thus an aspect ratio results of the length of the micro-slot 31 to the width thereof in the through-hole of the lower opening or base 22 which should have a value of 20 to 50.

The quality of the side wall 21, i.e. the uniformity of said surface is of less relevance. It is even better when said side walls 21 of the micro-slots 31 are uneven. In this case, the roughness of the surface may be up to 0.01 or up to 0.05 millimeters. This roughness only has an effect where the panels 30 and 35 have a separate sound-absorbing action.

Overall, the total free surface per square meter of the panel 10 should be between 1 and 10 percent, advantageously between 3 and 10 percent and by way of example approximately 5 to 10 percent, more advantageously between 7 and 8 percent. This value corresponds to the above-cited first exemplary embodiment and refers to the surface area of the smaller micro-slot openings 22 on the lower face of the panel or coating 30.

This embodiment relates to the possible adjustment of the laser strength by the person skilled in the art, with regard to the material and the scanning speed, as in the upper region of the upper coating 30 or the lower coating 35 the material is completely burnt away by the focused laser beam, whilst the arrangement of the beam waist of the laser beam in the lower region of the upper portion results in that, during the scanning dwell time of the laser beam, the material of the inner panel 10 is only burnt away to the extent that the lower small base opening 22 is formed in the inner panel 10, which therefore may lead to the funnel-shaped walls 21 in this panel 10 or in the transition to the coatings 30 and 35. In the material of the panel 10, it is also possible that the slot does not run in a funnel-shaped manner in cross section but is substantially rounded over its depth. It is possible to open up a wider slot by the scanning movements of the light beam acting upon the slot not only being carried out in the longitudinal direction of the micro-slots 31 but also in the transverse direction; but as this leads to hindering the production speed, a single scan is preferred.

The micro-slots 31 are advantageously produced by being subjected to laser radiation from the upper face 12 of the panel or coating 30 and the lower face 13 of the panel or coating 35, it being essential that the beam waist of the laser beam in the region of the centre of the thickness of the coating 30 is positioned right up to, and within, the central panel 20. It is essential that the person skilled in the art adjusts the power of the laser depending on the colour and the absorption behaviour of the polymer material or, for example, the metal material of the panel 10 and the scanning speed, i.e. the time which the laser beam requires in order to burn a micro-slot 31 over a predetermined longitudinal path, so that when scanning the cross section of the slot, symmetrically to the axis, the funnel is formed with the oblique side walls 21 only in the central panel 20 and the depth of the burnt away material is such that a continuous slot is burnt into the coating 30 or 35, which is connected on the lower face to pores of the open-pore panel material 20.

In order to treat the panel 20 in a time-efficient manner, and to provide it with the large number of micro-slots, an engraving laser is used, for example for test purposes and for panels 20 having a size of 500 by 500 millimeters, a LS900XP manufactured by Gravograph has been used, which with a maximum power of 80 watts and a scanning speed of up to 4 meters/second provides the required performance characteristics. Naturally, other lasers and deflector optics may also be used.

The depth of the holes through the coating 30 and/or 35 with the material of the central panel is ca. 1 to 6 millimeters.

It is essential that the holes, slots or micro-slots are introduced through the two top layers 30 and 35 which do not contribute to the sound absorption, i.e. both from the upper face 12 and from the lower face 13—viewed according to FIG. 1.

FIG. 2 shows an enlarged cross-sectional view of two holes or micro-slots 31 which extend through the fine chipboard top layer 30 and the panel layer 35 to the open-pore chipboard panel 20, which are, in particular, 1 to 6 millimeters wide. The micro-slots 31 preferably have a diameter of between 0.1 and one millimeter. They are advantageously arranged adjacent to one another at a spacing of 1 to 10 millimeters. The micro-slots may also be holes with this diameter.

When micro-slots 31 are used—viewed from above—each has a longitudinal slot shape which has side walls 32 oriented substantially vertically to the surface 12 and/or lower face 13 of the panel 10. These side walls 32 extend through the top layer 30 and/or 35 and terminate in a funnel-shaped end 33 in the cross-sectional view of FIG. 2, as a slotted base or perforated base.

This means that by subjecting the upper face 12 to a laser beam, material is removed between the side walls 32 and is discharged to the surroundings by evaporation. Said hole or said slot passes through one, or through both, top layer(s) 30 and 35, and then by means of the laser beam a portion of material in the funnel-shaped end 33 is also removed from the central chipboard panel 20. In other words, each hole, slot or micro-slot 31 forms a direct acoustic connection over its depth between the walls 32 of the top layers 30 and 35 with the pores of the open-pore central chipboard panel 20. In this regard, it is ensured that the central support panel as an open-pore chipboard panel 20 may contribute substantially to the overall sound absorption of the acoustic panel, and is not shielded by the top layers forming the closed surfaces. By the choice of open-pore chipboard panels 20 as the central element and support panel, it is now possible by means of the method according to the invention to achieve the sound-absorbing properties of the acoustic panel 10, as a whole by the introduction of a plurality of holes, slots or micro-slots 31 into the panel 10.

The central layer of the panel 10 may consist of softboard MDF with numerous cavities 121.

In each case, the micro-slots 31 may have different widths and/or different lengths and/or different depths in the rows of micro-slots 31.

The depth of the micro-slot in the panel may be, in particular, between 0.02 to 0.5 millimeters, preferably 0.1 to 0.4 millimeters and more preferably 0.3 millimeters.

| LIST OF REFERENCE NUMERALS | |
| --- | --- |
| 10 | Acoustic panel |
| 12 | Upper face |
| 13 | Lower face |
| 20 | Support panel |
| 21 | Side walls |
| 22 | Base of slot |
| 30 | Fine chipboard layer |
| 31 | Slot |
| 32 | Side wall |
| 33 | Slot base |
| 35 | Top coating |
| 121 | Internal cavities |

The invention claimed is:

1. A method for producing a sound-absorbing panel comprising an open-pore support panel having two side surfaces and a cover panel or coating of the support panel, wherein the cover panel or coating is fixedly connected on one of the side surfaces of the open-pore support panel; comprising the method steps of:

arranging the sound-absorbing panel with the side surface provided with said cover panel or coating in front of a laser device that emits a laser beam, subjecting the side surface of said panel to the laser beam emitted from the laser, the laser beam being configured to burn away material from the cover panel or coating facing said laser beam over the depth in the direction of the laser beam in a plurality of holes, wherein the laser beam acts on the panel such that the beam waist is focused on a plane parallel a lower face of the cover panel or coating that is opposite to the side on which said laser beam is incident, such that the holes are continuous through the cover panel or coating, and a portion of material is removed from the support panel, such that a lower hole opening is produced in the support panel that extends partly into said open pore support panel, so that the surroundings of the sound-absorbing panel on both side surfaces are connected to the open-pore support panel via an air connection, and wherein the holes passing through the cover panel or coating are terminating in large numbers in the pores of the support panel.

2. The method according to claim 1, wherein the other side surface is also covered by a cover panel or coating creating a triple-layer panel, wherein the method comprises the further step of subjecting the other side surface of said panel to the laser beam emitted from the laser, the laser beam being configured to burn away material from the cover panel or coating facing said laser beam over the depth in the direction of the laser beam in a plurality of holes, wherein the laser beam acts on the panel such that the beam waist is focused on a plane parallel to the lower face of the cover panel or coating, such that the holes are continuous through the cover panel or coating, and a lower hole opening is produced in the support panel so that the surroundings of the sound-absorbing panel on both side surfaces are connected to the open-pore support panel via an air connection.

3. The method according to claim 1, wherein the holes through the cover panel or coating being micro-slots having a diameter of 0.02 to 0.5 millimeters.

4. The method according to claim 1, wherein the cover panel is being made of wood, paper, veneer, plastics or metal.

5. The panel according to claim 1, wherein the central support panel is made of a wood-based material.

6. The panel according to claim 1, wherein the support panel is a wooden panel.

7. The panel according to claim 1, wherein the support panel is a chipboard panel.

8. The method according to claim 1, wherein the laser beam moves over the surface of the upper face of the panel in order to burn away a series of micro-slots arranged one behind the other in one direction, and spaced apart from one another, said micro-slots being arranged adjacent to one another in rows.

9. The method according to claim 8, wherein rows of micro-slots being produced have at least one of different widths, different lengths or different depths.

10. The method according to claim 1, wherein the laser beam moving over the surface of the upper face of the panel, the scanning speed, the power of the laser beam and the focusing of the laser beam are adjusted such that a funnel-shaped slot is burnt away with oblique side walls.

11. The method according to claim 10, the power of the laser beam being predetermined such that on the lower face of the cover panel or coating, a micro-slot with a width of between 0.02 to 0.5 millimeters in the open-pore support panel is produced.

12. The method according to claim 11, the power of the laser beam being predetermined such that on the lower face of the cover panel or coating, a micro-slot with a width of between 0.1 to 0.4 millimeters and even more preferably 0.3 millimeters in the open-pore support panel is produced.

13. The method according to claim 11, the power of the laser beam being predetermined such that on the lower face of the cover panel or coating, a micro-slot with a width of 0.3 millimeters in the open-pore support panel is produced.

* * * * *